United States Patent
MacKinnon et al.

(10) Patent No.: US 7,141,200 B2
(45) Date of Patent: *Nov. 28, 2006

(54) PROCESS OF SIMULTANEOUSLY MOLDING A PLURALITY OF SHINGLES

(75) Inventors: Thomas Kevin MacKinnon, Ann Arbor, MI (US); Joong Youn Kim, Newtown Square, PA (US); Richard Allan Snyder, Eagleville, PA (US); Husnu M. Kalkanoglu, Swarthmore, PA (US); Gregory F. Jacobs, Oreland, PA (US)

(73) Assignee: CertainTeed Corporation, Valley Forge, PA (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/736,916

(22) Filed: Dec. 16, 2003

(65) Prior Publication Data

US 2005/0126112 A1    Jun. 16, 2005

(51) Int. Cl.
*B29C 49/04*    (2006.01)

(52) U.S. Cl. .................. 264/515; 264/516; 264/523; 264/157; 264/267; 264/46.6

(58) Field of Classification Search ................ 264/516, 264/528, 515, 523, 157, 267, 46.6
See application file for complete search history.

(56) References Cited

U.S. PATENT DOCUMENTS

| | | |
|---|---|---|
| 2,298,716 A | 10/1942 | Moreland et al. |
| 2,913,962 A | 11/1959 | Knowles |
| 4,290,248 A | 9/1981 | Kemerer et al. |
| 4,295,445 A | 10/1981 | Kopenhaver |
| 5,181,361 A | 1/1993 | Hannah et al. |
| 5,501,056 A | 3/1996 | Hannah et al. |
| 6,161,354 A | 12/2000 | Gilbert et al. |
| 6,178,703 B1 | 1/2001 | Noone et al. |
| 6,319,456 B1 | 11/2001 | Gilbert et al. |
| 6,455,113 B1 | 9/2002 | Bilodeau |
| 6,464,907 B1 | 10/2002 | Gross |
| 6,482,347 B1 | 11/2002 | Davis et al. |
| 6,488,884 B1 | 12/2002 | Daubenbuchel et al. |
| 6,495,089 B1 | 12/2002 | Crider |
| 6,499,988 B1 | 12/2002 | Miura et al. |
| 6,508,643 B1 | 1/2003 | Singleton et al. |
| 6,524,520 B1 | 2/2003 | Tsuji et al. |
| 6,554,932 B1 | 4/2003 | Wrobbel |
| 6,558,609 B1 | 5/2003 | Singleton |
| 6,685,861 B1 * | 2/2004 | Akkapeddi et al. .......... 264/241 |

FOREIGN PATENT DOCUMENTS

JP    07-132552 A  *  5/1995

* cited by examiner

*Primary Examiner*—Suzanne E. McDowell
(74) *Attorney, Agent, or Firm*—Paul & Paul

(57) ABSTRACT

A process of simultaneously molding either a plurality of shingles or double walled shingles or other substantially planar exterior building products is provided, such that a blow moldable thermoplastic material is provided, of a composite parison that is then blow molded in a hollow mold, to produce novel shingles according to the process. Ventilation and/or insulation can be provided to a hollow interior between spaced apart walls of a double walled shingle.

21 Claims, 13 Drawing Sheets

PROCESS OF SIMULTANEOUSLY MOLDING A PLURALITY OF SHINGLES

BACKGROUND OF THE INVENTION

In the art of shingle manufacture, particularly shingles for roofing, it has been known to manufacture shingles of bitumen-impregnated mat, with the mat often being of fiberglass construction, and with granules being applied to the bitumen-covered surface of the shingle, often with smaller granules, such as mica or the like, applied to the rear surface of the shingle, also held in place by bitumen on the rear surface of the shingle. Examples of such shingle manufacturing techniques are set forth in U.S. Pat. Nos. 4,295,445, 5,181,361, and 5,501,056, for example.

It is also known that shingles can be molded from hardenable materials, to simulate natural slate, wood shakes, or other natural materials. An example of molding shingles in the form of tiles is, for example, set forth in U.S. Pat. No. 6,178,703. In that patent, the material of shingle tile formation is essentially a clay, which hardens in a cement-like manner, to yield a fairly heavy shingle.

SUMMARY OF INVENTION

The present invention is directed to simultaneously molding a plurality of shingles. The shingle material can be designed to have certain weatherable features, such as, but not limited to rain and sun resistance, ultraviolet radiation resistance, color acceptance and retention, etc. The material optionally may also include scrap materials, recycled materials, less expensive materials, etc. . . . The material could also include a blow molded polyurethane layer or other foam material, for example to provide an insulation layer in the shingle, for insulating against heat or cold.

In accordance with this invention, a plurality of shingles can be simultaneously blow molded from a single parison, and with the parison being expanded within the mold to form a plurality of composite shingles within the mold.

Additionally, in accordance with this invention, a process is provided for molding a plurality of substantially planar exterior building products, of, preferably thermoplastic substantially planar building product material.

Accordingly, it is a primary object of this invention to provide a novel process for molding a plurality of shingles by blow molding a parison.

It is another object of this invention to accomplish the above object, wherein the plurality of shingles that are blow molded simultaneously are initially connected together, and then are at least partially or completely severed, to form the plurality of shingles.

It is yet another object of this invention to accomplish the above objects while providing the interior of the mold with desired surface configurations of three-dimensional type.

It is yet another object of this invention to accomplish the above objects, where the parison molds the core material to have a plurality of generally flat surfaces, when expanded.

Accordingly, it is another object of this invention to provide a double walled ventilated substantially planar exterior building product or shingle, which may or may not be insulated.

It is a further object of this invention to provide a double walled substantially planar exterior building product, preferable of the shingle type, which is insulated.

Further objects of this invention include the making of shingles in accordance with the processes described with respect to the objects above.

Other objects and advantages of the present invention will be readily apparent from a reading of the following brief descriptions of the drawing figures, the detailed descriptions of the preferred embodiments, and the appended claims.

BRIEF DESCRIPTION OF THE DRAWING FIGURES

DETAILED DESCRIPTION OF THE PREFERRED EMBODIMENTS

Figure 1:
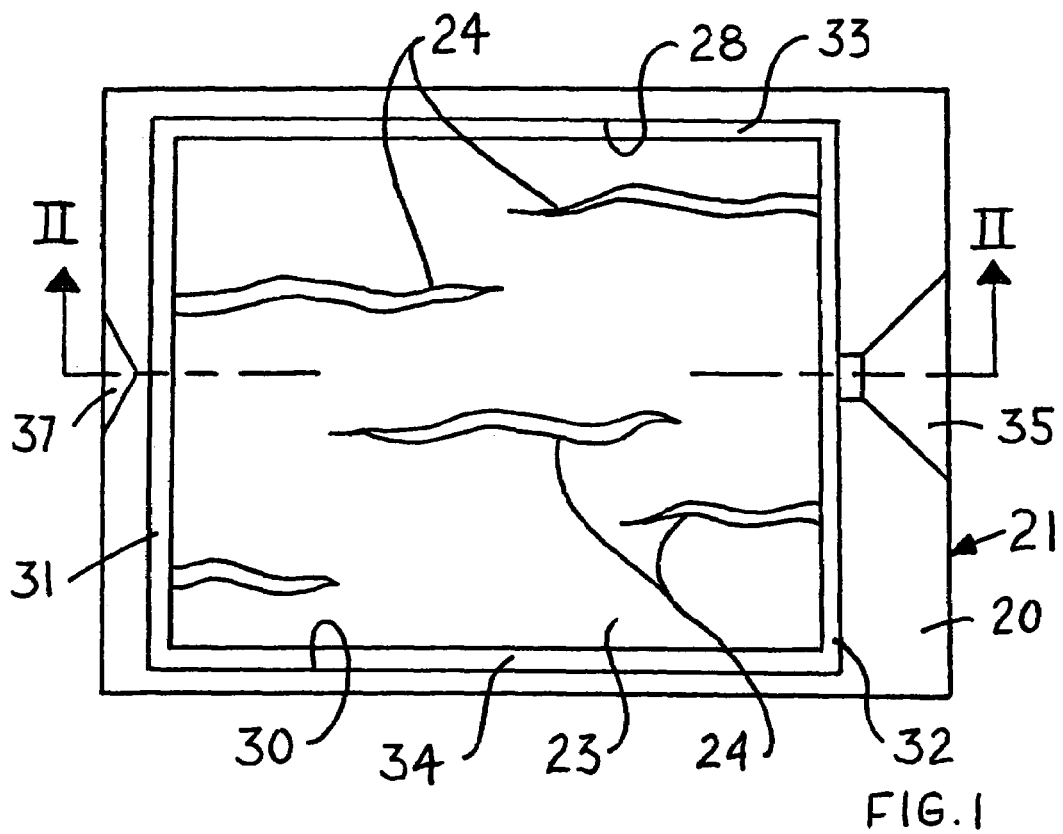
FIG. 1 is a plan view of one half of a two-shingle mold in accordance with this invention.

Referring now to the drawings in detail, reference is first made to FIG. 1, wherein a blow mold half 20 of a blow mold 21 is illustrated, having a cavity 22 therein, defined by a generally flat but tapered mold surface 23, having three-dimensional configurations 24 therein, which configurations 24 may be protrusions or may be relief as shown, with the configurations 24 being adapted to simulate various natural formations in a shingle to be molded in the mold half 21, such as to simulate natural slate, cedar shakes, or like aesthetic variations as may be desired to design into a synthetic shingle made in accordance with this invention.

Figure 2:
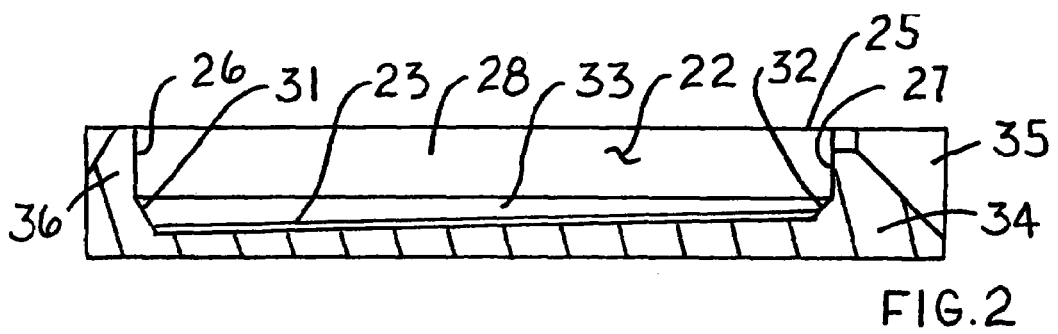
FIG. 2 is a vertical sectional view, taken through the mold half of FIG. 1, generally along the line II—II of FIG. 1.

The mold half 20 has an upper parting plane 25 and the cavity 22 is also defined in part by end surfaces 26, 27 and side surfaces 28 and 30, with connecting surfaces 31, 32, 33 and 34, which are shown as being chamfered, although the same could be rounded, arcuate, or take on any other configuration that may be desired for the shingle that is to be blow molded in the mold 21. The rightmost end 34 of the mold half 20 is provided with a parison inlet 35. The left-most end 36 of the mold half 20 as shown in FIGS. 1 and 2 is provided with a recessed parison pinch-off zone 37 as shown.

Figure 3:
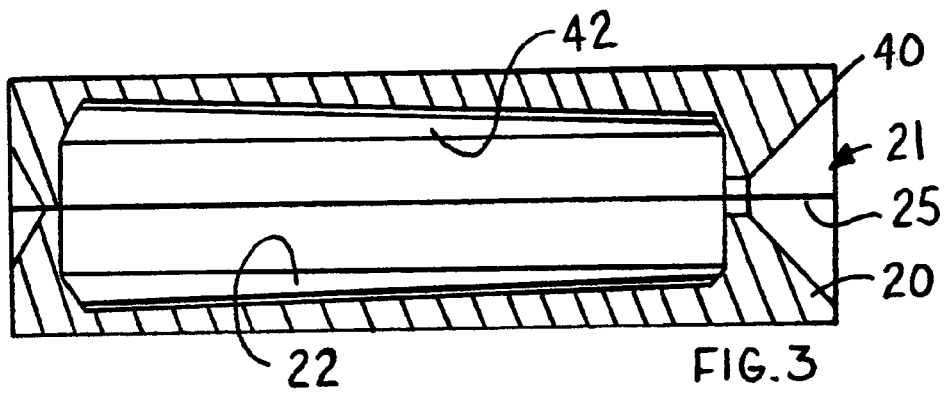
FIG. 3 is a vertical sectional view, taken through a shingle mold in accordance with this invention, wherein the mold is constructed to simultaneously mold a pair of shingles from a parison, with the mold of FIG. 3 being shown in the closed position.

With reference now to FIG. 3, it will be seen that the mold 21 is comprised of a lower mold half 20 and an upper mold half 40, with the upper mold half 40 essentially being a mirror image of the mold half 20. However, it will be understood that the mold halves 20 and 40 need not have recesses 22 and 42, respectively that are mirror images of each other, in that two entirely different configurations might be desired for lower and upper recesses 22 and 42, as may be desired.

Figure 4:
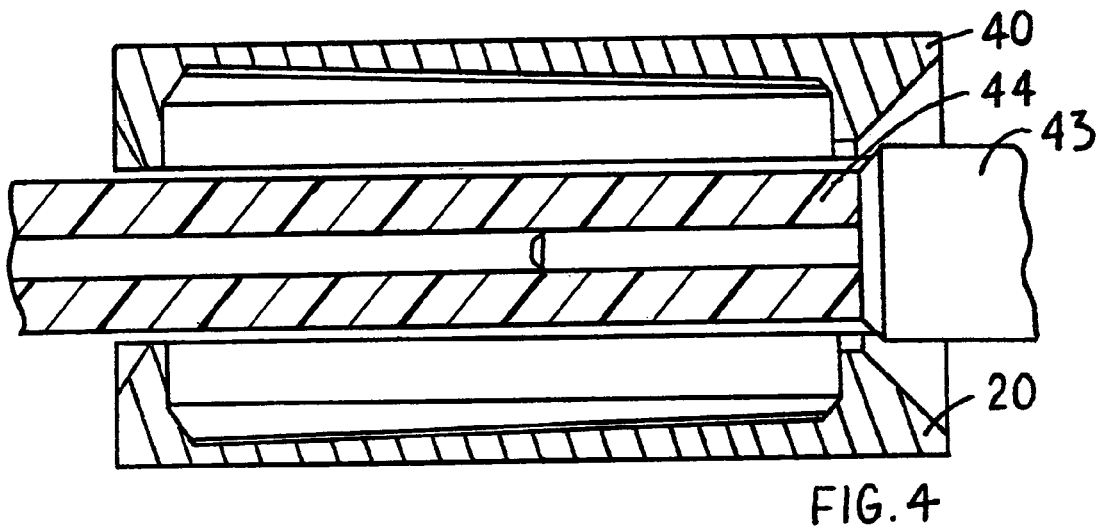
FIG. 4 is a vertical sectional view of the two halves of the mold of FIG. 3, spaced apart vertically, with a parison being injected between the two mold halves.

With reference to FIG. 4, it will be seen that the lower and upper mold halves 20 and 40 have been vertically separated, to be spaced apart, so that a parison-forming mold 43 may enter from the right side as illustrated in FIG. 4, bringing a parison 44 between the mold halves 20 and 40, as shown.

Figure 5:
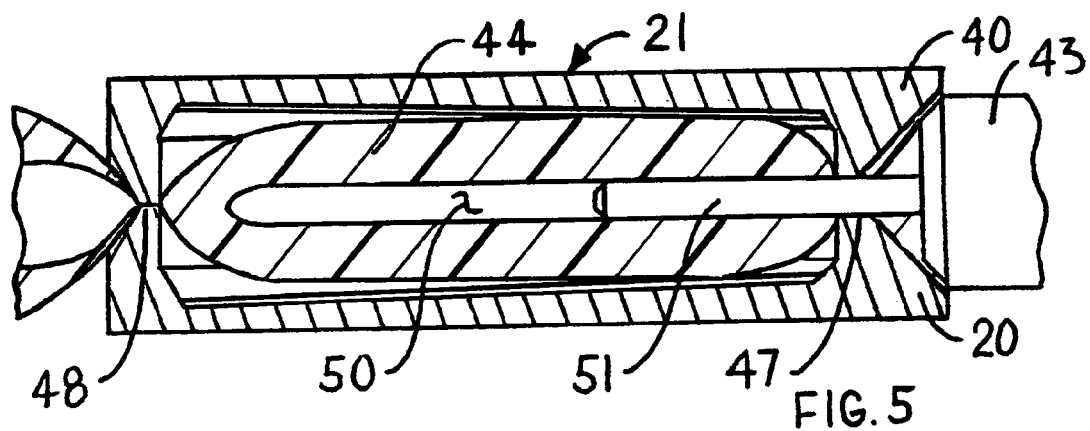
FIG. 5 is a vertical sectional view similar to those of FIGS. 3 and 4, but wherein the two mold halves are closed on the parison, having pinched the same closed, but prior to the blow molding process having taken place.

With reference to FIG. 5, it will be seen that the two mold halves 20 and 40 have been brought together vertically, so that the parison 44 is pinched off at the right end of the mold 21, at 47, and likewise is pinched off at the left end 48, as shown, leaving a void 50 inside the parison 44, into which is received at the right end, an air or other gas inlet 51 of the parison-forming mold 43.

Figure 6:
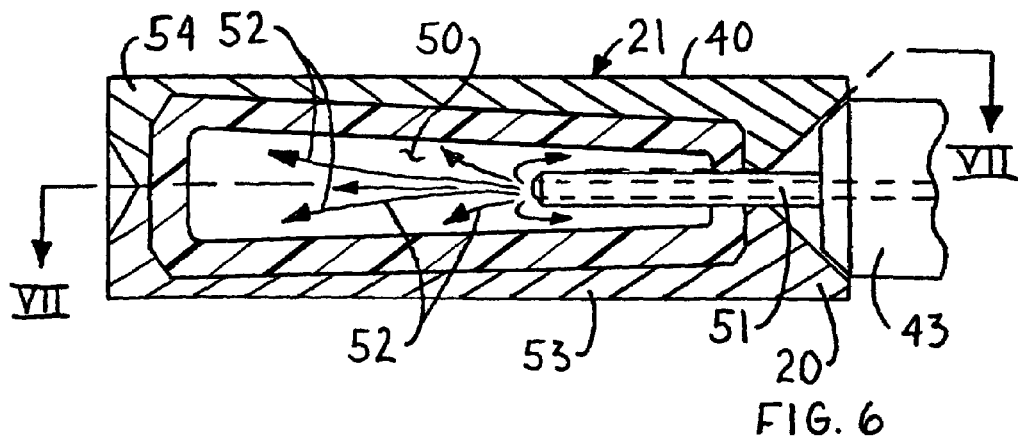
FIG. 6 is a vertical sectional view, taken through the mold of FIGS. 3–5, but wherein air has been injected into the parison, expanding the same, such that the parison material is expanded outwardly toward and against the surfaces of the two mold halves.
Figure 7:
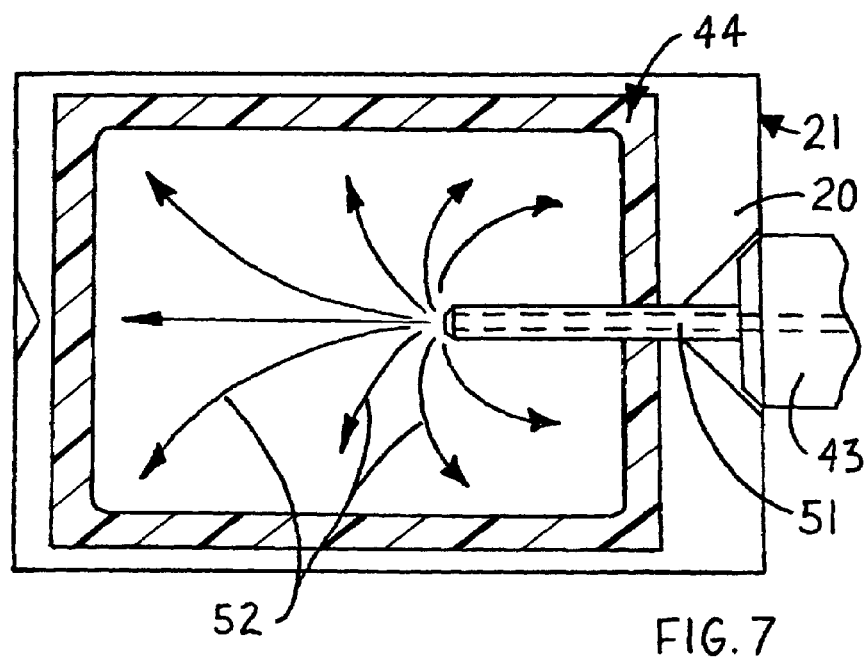
FIG. 7 is a horizontal sectional view, taken through the parison of FIG. 6, and showing the lower mold half of FIG. 6, with the illustration of FIG. 7 having been taken generally along the line VII—VII of FIG. 6.

With reference to FIG. 6, it will be seen that air (or other gas) is provided through the inlet 51 of the parison-forming mold 43, to fill the void 50 inside the parison 44, and expand the same outwardly against the interior walls of the mold half 20, 40, as shown by the arrows 52, such that the material of the parison 44 engages against the interior surfaces of the mold as shown in FIGS. 6 and 7

It will be understood that the mold halves 20, 40 have their walls 53, 54 constructed in a conventional manner to allow air outside the parison 44, but inside the interior walls of the mold halves 20, 40 to escape therefrom as air is injected inside the parison 44. Such conventional means for providing porosity for the walls 53 and 54 may include a plurality of air escape ports (not shown), extending through the walls 53, 54, in various locations, or may include the construction of the walls 53, 54 of the mold halves 20, 40 as being sufficiently foraminous, to allow air to escape therefrom, as air is injected through the inlet 51, into the cavity 50, so that the parison 44 may expand against the interior surfaces of the mold halves 20, 40.

Figure 8:
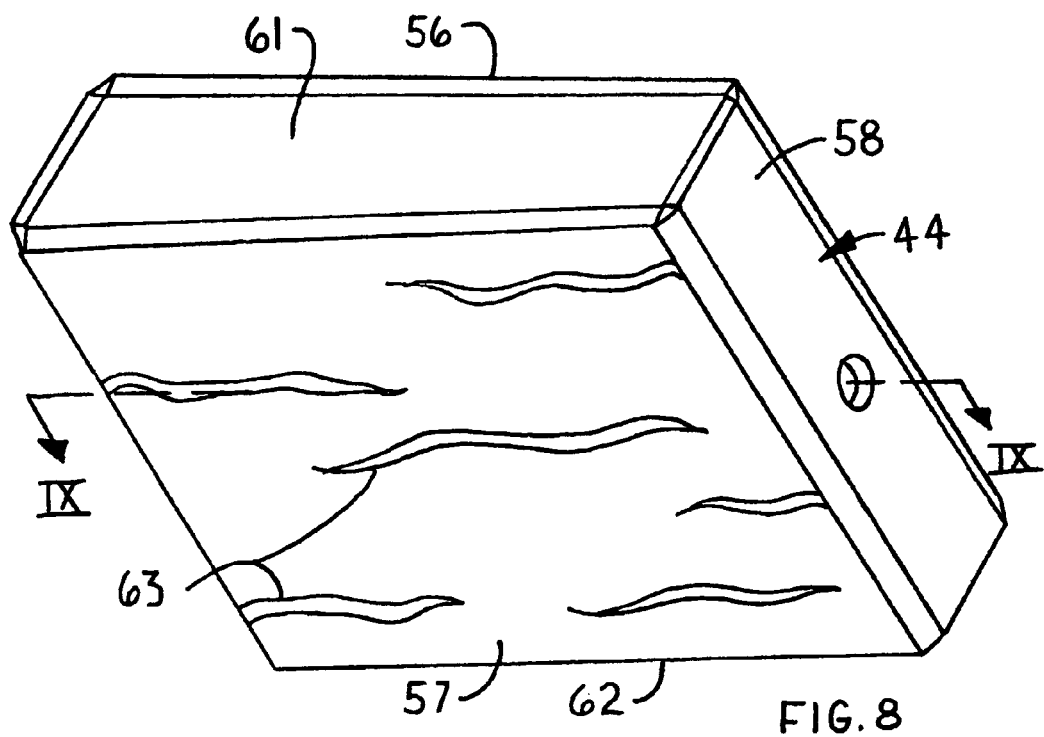
FIG. 8 is a perspective view of the blow molded parison of FIGS. 6 and 7, that has been cooled and removed from the mold, and which comprises the molded configuration of a pair of shingles and their connections together.

With reference now to FIG. 8, it will be seen that the expanded parison 44, having been cooled in the mold by any conventional means (not shown) and removed from the mold, will be comprised of upper and lower shingle formations 56, 57, connected on four sides by parison connection zones 58, 60, 61 and 62, with the exterior surfaces of the shingle formations 56 and 57 being provided with three-dimensional configurations 63, either in the form of relief zones or projections, depending upon the three-dimensional configurations 24 that have been molded thereinto, to form the configurations 63.

Figure 9:
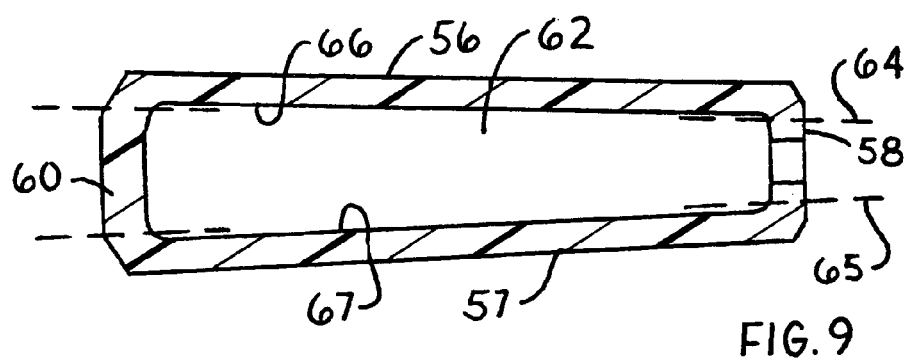
FIG. 9 is a sectional view, taken through the molded structure of FIG. 8, generally along the line IX—IX of FIG. 8, and wherein two planes are illustrated as being the planes along which the shingle configurations of FIG. 8 will be separated from the portions of the parison that were molded as connections between the two shingle configurations.

It will also be seen in FIG. 9, that planes of severance 64, 65 are provided, that are essentially parallel to the respective inner surfaces 66, 67, and most preferably in the same planes 64, 65 respectively, such that the parison connection portions 58, 60, 61 and 62, may be severed along those planes 64, 65, to yield two shingles 70, having three-dimensional aesthetic configurations 63 in the surface 71 of the material 72, as may be desired.

Figure 10:
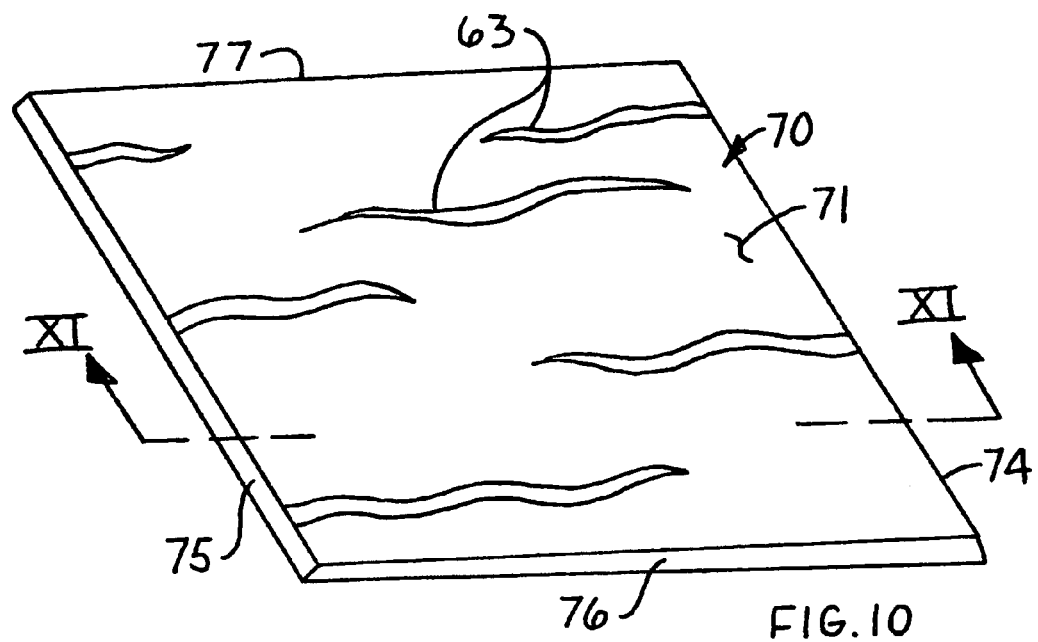
FIG. 10 is a perspective illustration of one of the two shingles formed following the severance of the shingle configurations pursuant to FIG. 9.
Figure 11:
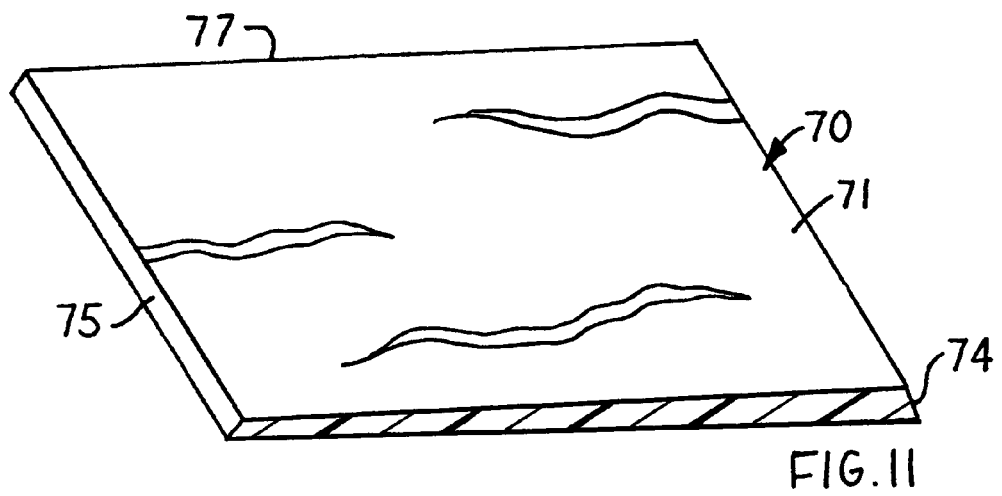
FIG. 11 is a sectional view, taken through the shingle of FIG. 10, taken generally along the line XI—XI of FIG. 10.

It will also be understood that the shingle 70 shown in FIGS. 10 and 11 is one which would have a greater thickness at its right end than at its left end, in that its right end would present a shingle edge 74 that would normally be the butt edge of the shingle, where as the left-most edge 75 as illustrated in FIGS. 10 and 11 would normally represent the upper headlap edge of the shingle in the installed condition on a roof.

Figure 12:
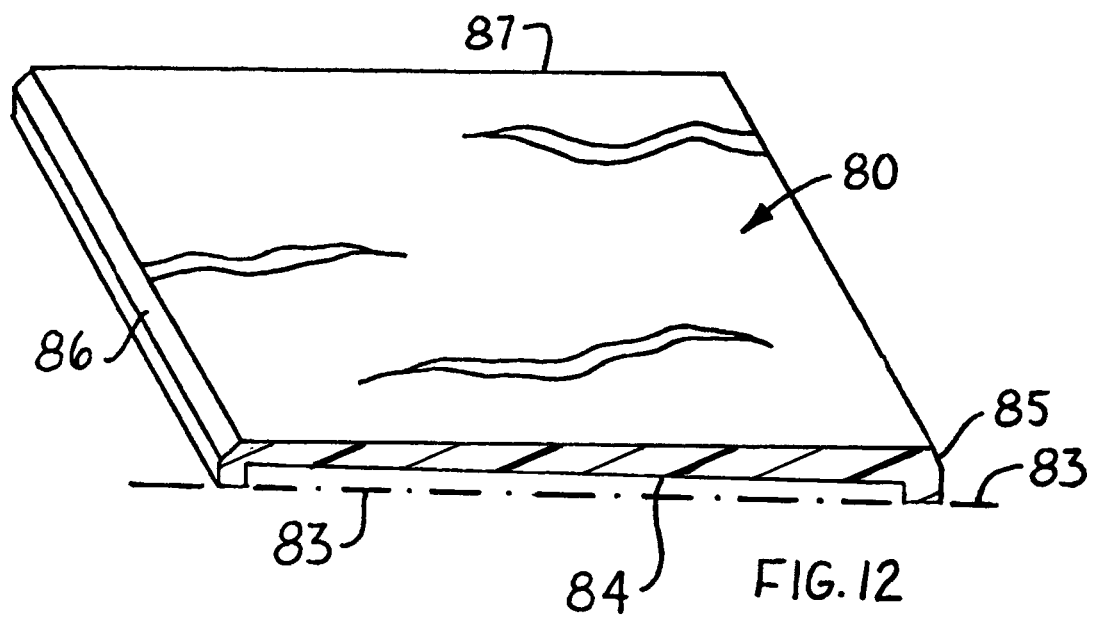
FIG. 12 is a perspective view of an alternative shingle in accordance with this invention, with the view being similar to that of FIG. 11, but wherein the severance of the shingle from the connecting material that connected a pair of opposed shingles, was severed along a plane parallel to the lower surface of the core material, but spaced therefrom.
Figure 13:
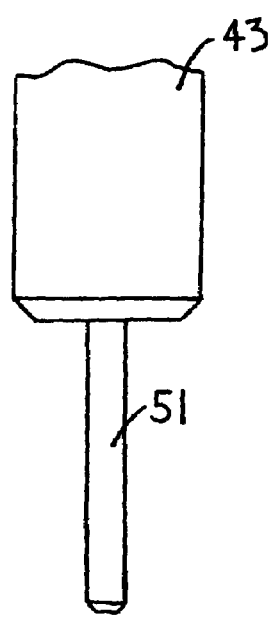
FIG. 13 is an elevation view of part of the parison-forming mold, fragmentally illustrated, in vertical orientation.
Figure 14:
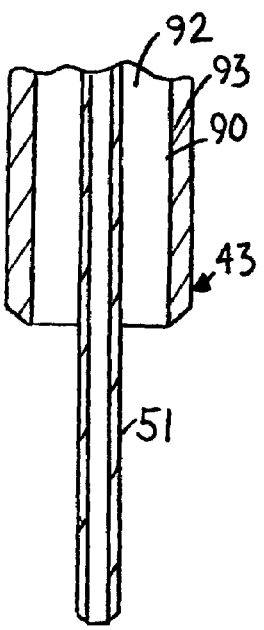
FIG. 14 is a sectional view of the parison-forming mold illustrated in FIG. 13, wherein the material that will form the parison may be extruded therefrom.

With reference to FIG. 12 it will be seen that an alternative shingle 80 is illustrated. However, in the shingle 80 of FIG. 12, it is demonstrated that the plane 83 of severance of shingles from parison connection portions as described above, is spaced from the undersurface 84, but generally parallel to the generally flat plane 84 that represents the undersurface to yield thicker peripheral edges 85, 86, 87, than if the plane 83 were substantially aligned with the surface 84, such that the shingle 80 when installed on a roof can yield an even thicker appearance than that of the shingle 70 of FIG. 11.

Figure 15:
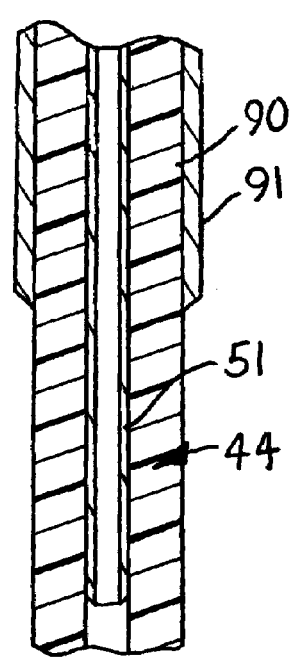
FIG. 15 is an illustration of the mold is shown in FIG. 14, but with the molten parison material being extruded into a tubular parison.
Figure 16:
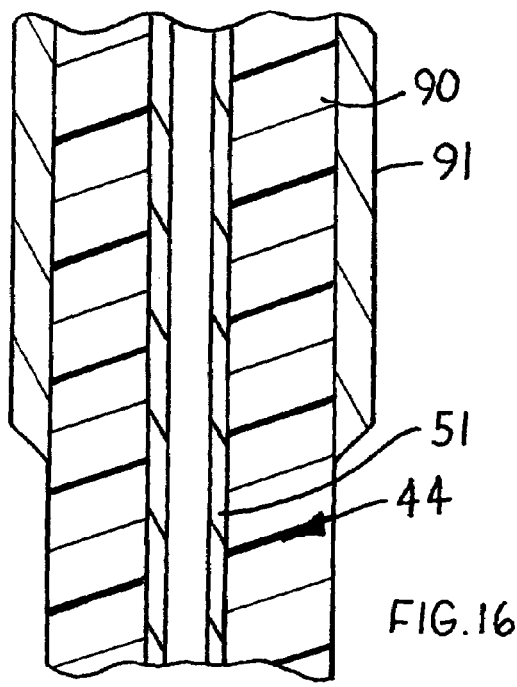
FIG. 16 is an enlarged fragmentary view of a portion of the parison-forming mold of FIG. 15, wherein the extrusion is more clearly illustrated.

With reference now to FIGS. 13–16, it will be seen that the parison-forming mold 43 is provided with its air tube 51 protruding downwardly therefrom, as shown, and that an extrusion cylinder 90 is provided, for receiving parison-forming material in the cylindrical void 92, which material will be provided under pressure, to be extruded therefrom, as shown in FIG. 15, whereby parison-forming material 44 will be extruded to yield a parison 44 as described above.

Figure 17:
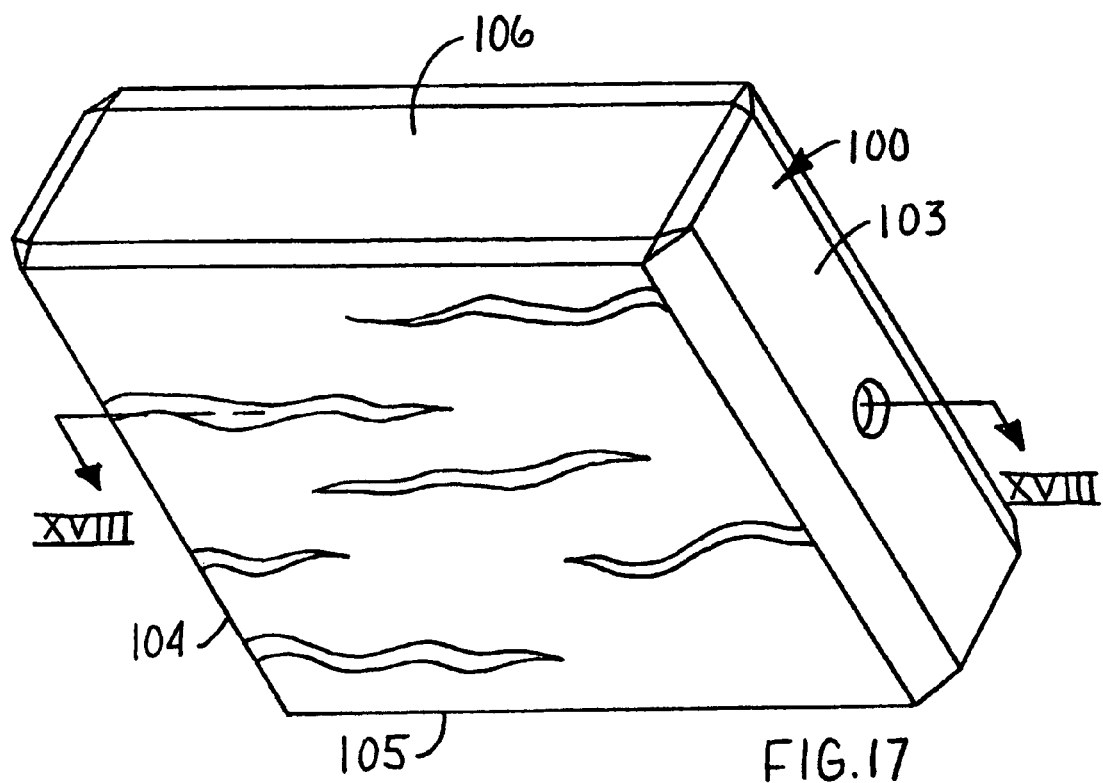
FIG. 17 is a perspective view, similar to that of FIG. 8, but wherein the connected two molded shingles are shown in a different embodiment, of uniform thickness throughout, as distinguished from the tapered configuration illustrated in FIG. 9.
Figure 18:
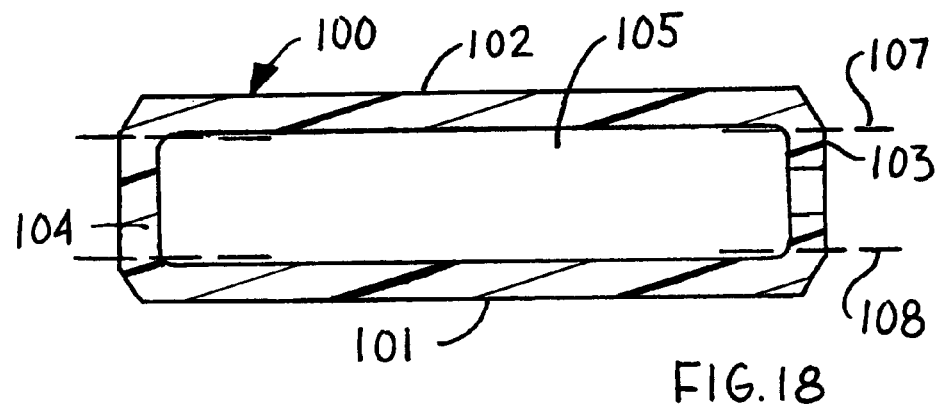
FIG. 18 is a sectional view, similar to that of FIG. 9, but of the uniform-thickness shingle embodiment of FIG. 17, taken generally along the line XVIII—XVIII of FIG. 17.

With reference now to FIGS. 17 and 18, an alternative double shingle structure 100 to the double shingle structure formed from the parison 44 of FIG. 8 is illustrated, comprising two shingle formations 101 and 102, like those shown in FIG. 9, connected together by parison connections 103, 104, 105 and 106, to be severed along severance planes 107, 108, in the manner described above with respect to FIGS. 8 and 9, but wherein the shingle formations 101, 102 are of uniform thicknesses, as shown, as distinguished from the tapered thickness formation shown with respect to the shingle formations of FIGS. 8 and 9. Otherwise, the shingle formations of FIGS. 17 and 18 are similar to those of FIGS. 8 and 9.

Figure 19:
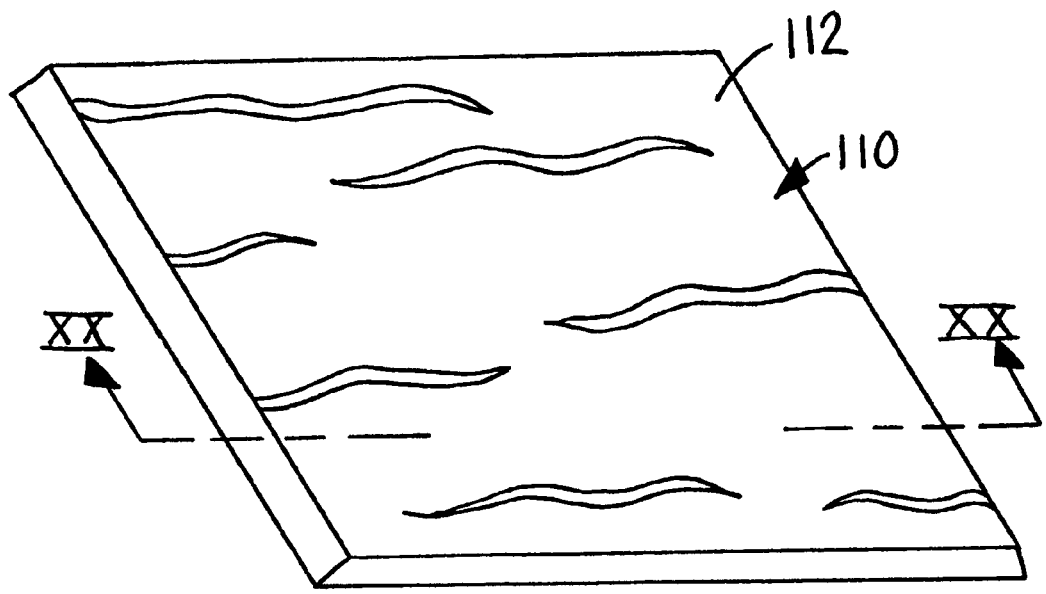
FIG. 19 is a perspective view of a shingle severed in accordance with the severance lines shown in FIG. 18, and is otherwise similar to the shingle embodiment of FIG. 10, but of a different embodiment.
Figure 20:
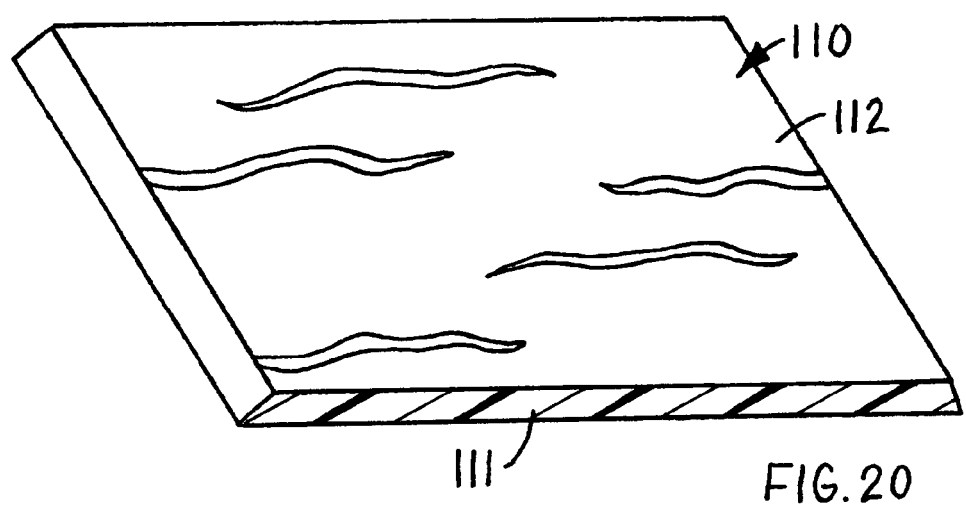
FIG. 20 is a sectional view of the shingle embodiment of FIG. 19, taken generally along the line XX—XX of FIG. 19.
Figure 21:
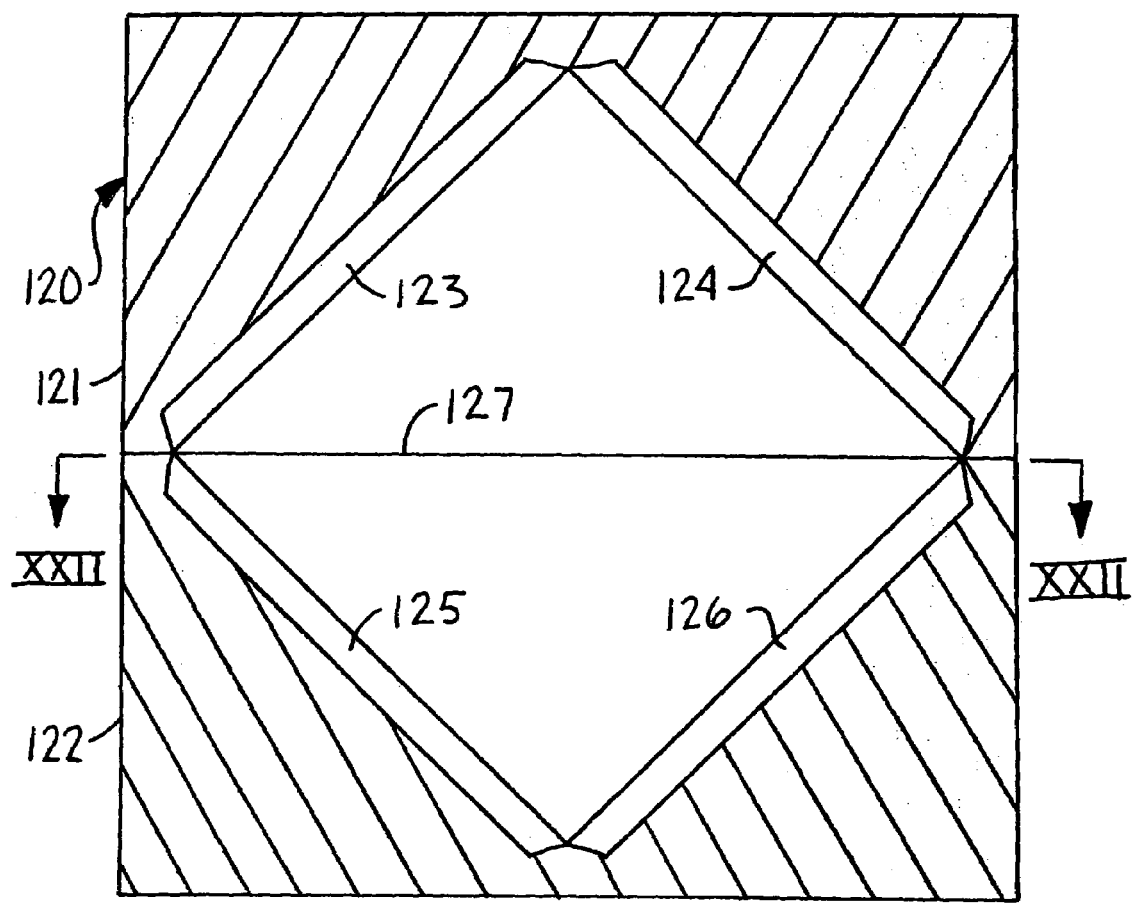
FIG. 21 is a sectional view, taken through a four-shingle blow mold in accordance with this invention.
Figure 22:
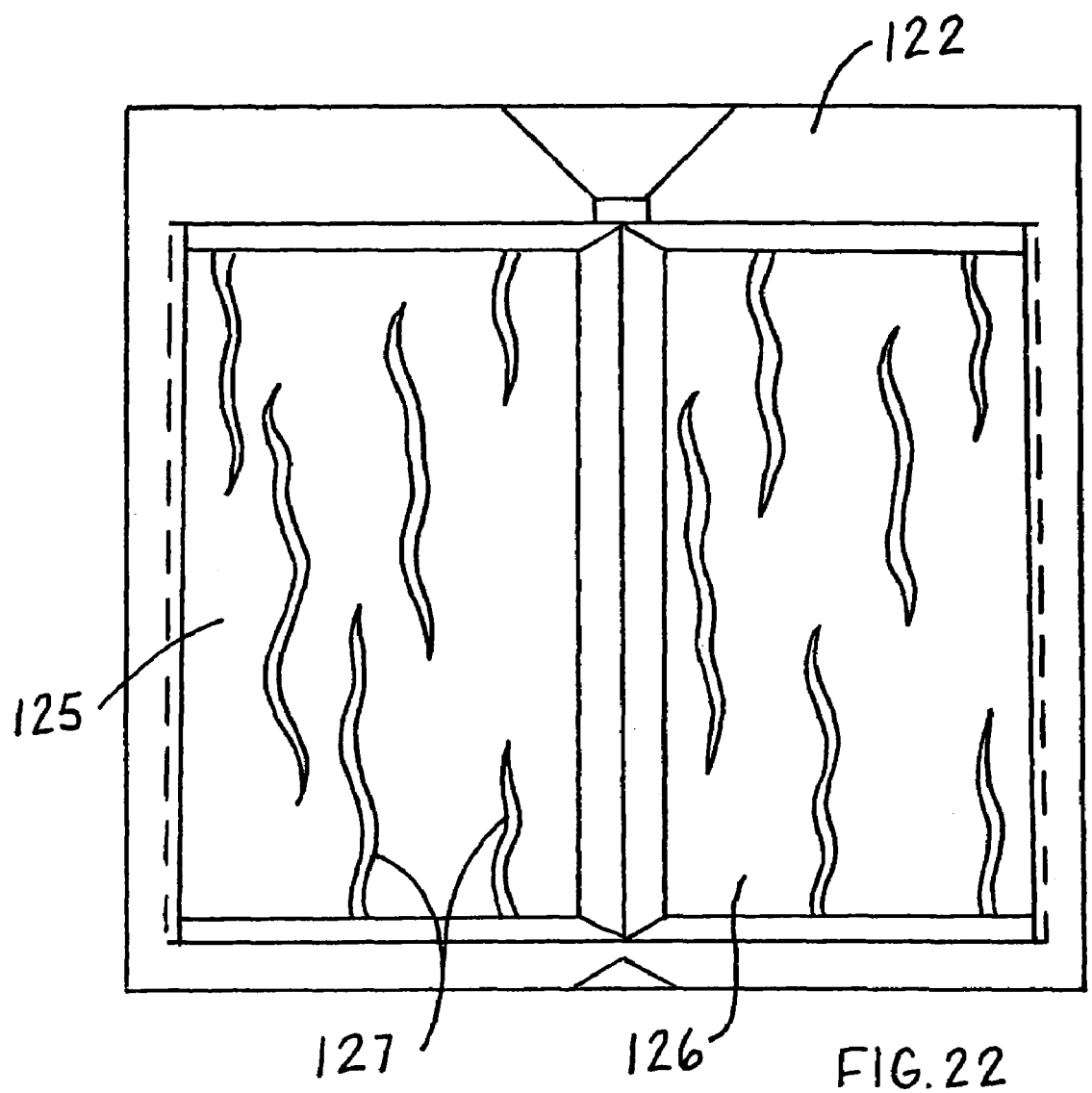
FIG. 22 is a view of one half of the mold of FIG. 21, taken generally along the line XXII—XXII of FIG. 21.

FIGS. 19 and 20 represent the separate shingles formed from the formed and cooled double shingle structure 100 of FIGS. 17 and 18, after the parison connection portions 103–106 have been severed therefrom, to yield a pair of shingles 110.

With reference now to FIGS. 21 through 24, it will be seen that a mold 120 may be provided in the form of mold halves 121 and 122, which, together, can provide a means for simultaneously making a greater number of shingles in the same mold. For example, in the mold 120, four shingle-forming recesses 123, 124, 125 and 126 are provided by the two mold halves 121 and 122, for receiving a parison therein after the mold halves 121 and 122 are separated along the parting plane 127, with each of the shingle-forming recesses 123–126 being provided with relief or projections for forming three-dimensional surface configurations for the exterior of the capstock material of a shingle formed therein.

Figure 23:
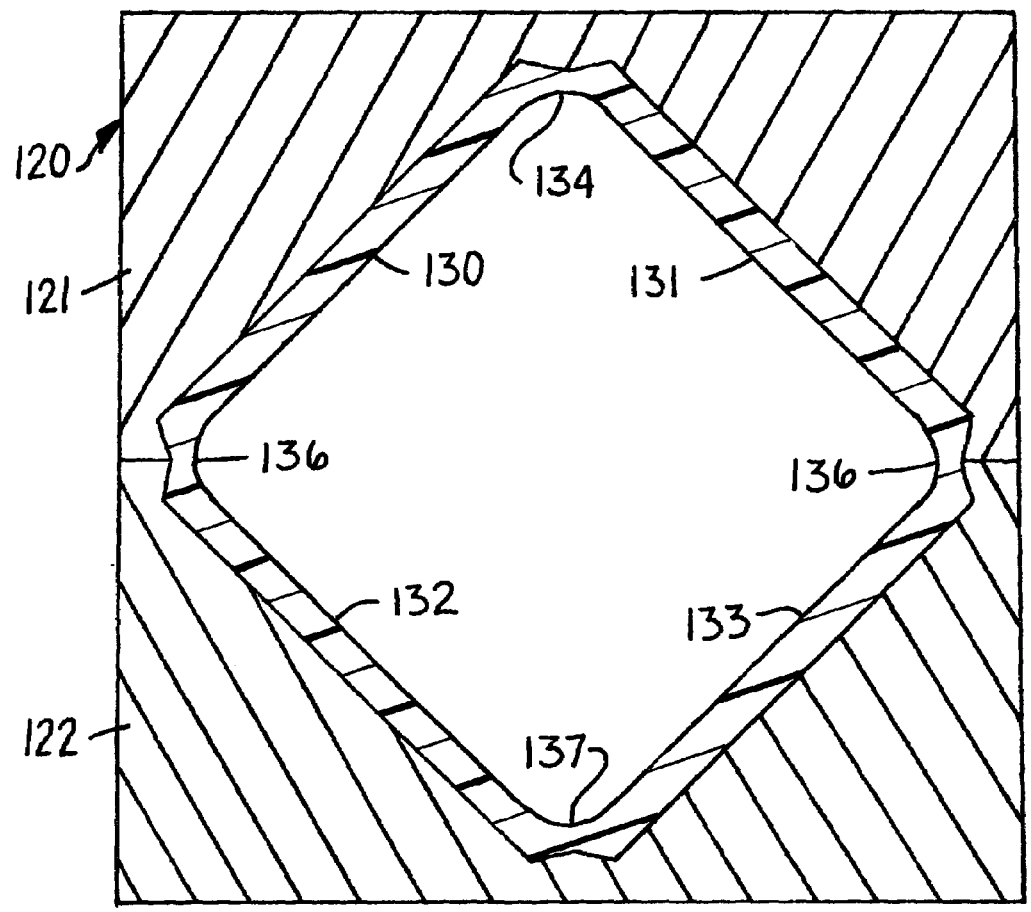
FIG. 23 is a sectional view, through the four-shingle mold of FIG. 21, after the parison has been blow molded against the interior surfaces of the two mold halves of FIG. 21, wherein the four two-layer shingles are illustrated connected together.
Figure 24:
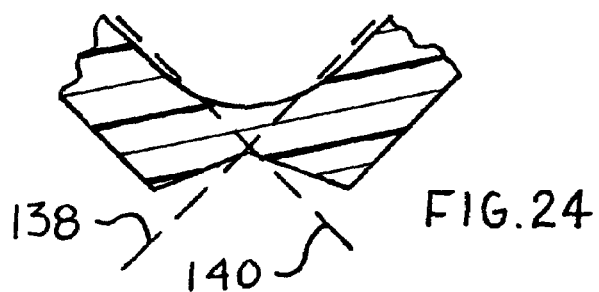
FIG. 24 is a fragmentary sectional view of a portion of two of the shingles of FIG. 23, with cut planes being illustrated as to where the severance of the shingles will be made, to separate two adjacent shingles from the connecting material that connects them during the molding process.

With specific reference to FIGS. 23 and 24 it will be seen that four shingle formations 130 through 133 are made simultaneously in the mold 120, by bringing a parison between the mold halves 121, 122, in the same manner described above, with air being injected into the parison, with each shingle formation 130 through 133 being disposed against the interior surface of the mold, as shown, and with the shingle formations 130–133 being connected by suitable parison connections 134, 135, 136 and 137, that will be severed therefrom by cuts made along suitable severance planes 138, 140 as shown in FIG. 24.

Thus, the result of blow molding a parison in a mold 120 will yield four separate shingles.

It will also be apparent that in a multiple shingle mold such as shown in the various Figures, each shingle-forming recess need not be identically constructed, but that different aesthetic configurations may be provided in a single mold.

Figure 25:
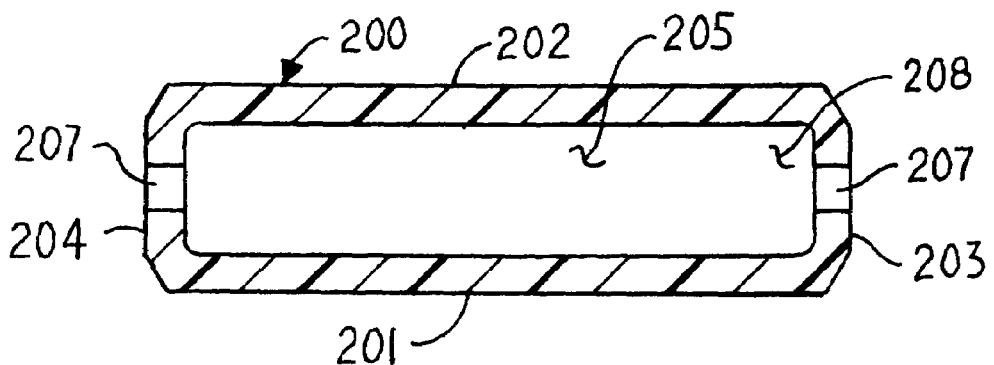
FIG. 25 is a sectional view like that of FIG. 18, but wherein the embodiment is not severed, and with additional ventilation holes between the two upper and lower molded shingle layers.

FIG. 25 is similar to that of FIG. 18, but wherein the shingle structure 200 is retained in its molded form, and is not separated by horizontal cut or separation lines as is the embodiment of FIG. 18, and wherein opposed planar surfaces of the substantially planar exterior building product 200 remain spaced apart by the zone 208. Thus, the opposed walls of material are indicated by the numerals 201 and 202, with right and left side walls 203 and 204, and end walls 205 and its opposite wall (unnumbered) defining the ventilation space 208. A plurality of ventilation holes 207 are provided in side walls 203 and 204, although in the sectional view of FIG. 25 only two openings 207 are illustrated. Thus, there is presented a hollow shingle 200 that may be ventilated to reduce the effect of heat buildup when applied to a roof, especially during hot weather conditions.

Figure 26:
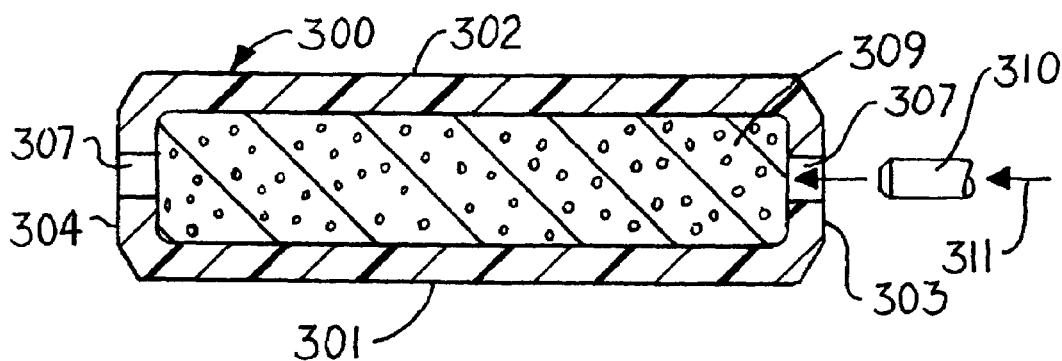
FIG. 26 is a sectional view similar to that of FIG. 25, but wherein a foam is injected between the two upper and lower shingle layers of the shingle embodiment.

With reference now to FIG. 26, a shingle embodiment 300 is provided, comprised of two layers of material, such layers being identified by numerals 301 and 302, by sidewalls 303 and 304, and end walls (unnumbered). A polyurethane or other foam is injection molded into one of the openings 307, by means of an injector 310, delivering the expandable foam in the direction of the arrow 311, such that the foam expands inside the opening in the double walled embodiment 300, as shown in FIG. 26, for purposes of insulating the double walled shingle 300 or other substantially planar exterior building product, either against heat build-up when disposed on a roof subject to hot weather conditions, or for purposes of retaining air conditioning or heat within the building to which the shingle 300 is applied.

Figure 27:
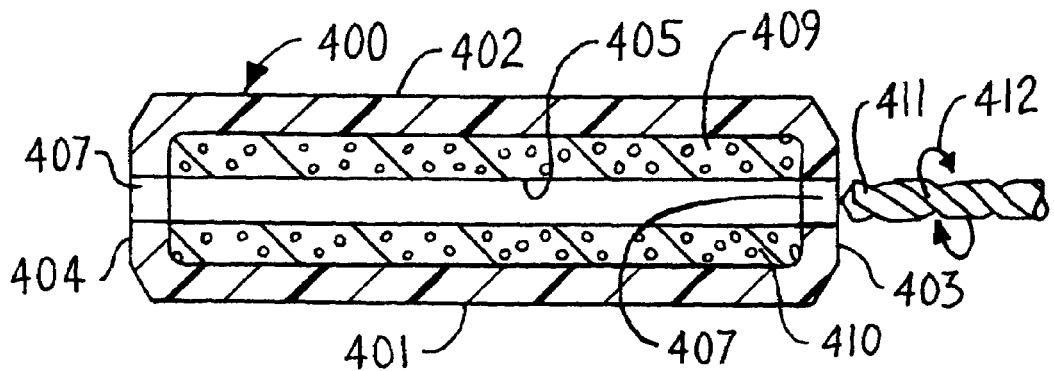
FIG. 27 is a sectional view similar to that of FIG. 26, but wherein the foam inside the embodiment is removed between the ventilation openings.

With respect to FIG. 27, an illustration like that of FIG. 26 is provided, but wherein a bank of drills or other cutting or clearing mechanisms 11 are provided, generally rotateably driven as at 412, to cut a plurality of side-to-side ventilation openings 405 between the side walls 403, 404 of the shingle 400, between ventilation openings 407, and generally parallel to the opposing major walls 401, 402 of the double walled embodiment 400, whereby the insulation layers 409, 410 will provide insulation as described above with respect to the embodiment of FIG. 26, but wherein the elongated holes 405 between the ventilation openings 407 provide ventilation in accordance with that which is described above with respect to the embodiment of FIG. 25.

It will be apparent from the foregoing that various modifications may be made in the process steps of this invention, as well as in the materials and in the mold configurations, to yield a wide variety of novel shingles, all made in accordance with the novel processes of this invention, and that various modifications may be made in the details of the process and molding structure, to yield various variations in the shingles made thereby, all within the spirit and scope of the invention as defined in the appended claims.

What is claimed is:

1. The process of simultaneously molding a plurality of substantially planar exterior building products, each being of thermoplastic substantially planar building product material, comprising the steps of:
    (a) providing a parison of molten thermoplastic material;
    (b) delivering the parison into a hollow mold;
    (c) closing the mold;
    (d) blow molding the parison into a plurality of substantially planar configurations by injecting a gas into the parison in the mold to expand the parison in the mold outwardly against interior surfaces of the mold; and
    (e) cooling the expanded parison and removing it from the mold; whereby
    (f) a plurality of substantially planar exterior building products are formed from the parison.

2. The process of claim 1, wherein the substantially planar exterior building products comprise shingles.

3. The process of claim 2, wherein the plurality of shingles are connected together and including the step of at least partially severing the plurality of shingles from each other.

4. The process of claim 2, wherein the plurality of shingles are connected together and including the step of severing the plurality of shingles from each other.

5. The process of claim 1, wherein at least one interior surface of the mold is provided with predetermined surface three-dimensional configuration and wherein a surface of the parison material that is disposed against said at least one surface of the mold is provided with three-dimensional surface configuration from the at least one surface of the mold.

6. The process of claim 1, wherein the expanded parison in the mold includes an interior surface comprised of a plurality of generally flat surfaces.

7. The process of claim 6, wherein the plurality of building products are connected together and including the step of at least partially severing the plurality of products from each other, wherein the step of at least partially severing the plurality of products from each other is accomplished along planes generally parallel to said flat surfaces.

8. The process of claim 7, wherein said planes are in the same planes as said flat surfaces.

9. The process of claim 2, wherein the mold is configured to simultaneously produce at least two shingles from the same parison.

10. The process of claim 9, wherein the mold is configured to simultaneously produce mold connections for the shingles from the same parison.

11. The process of claim 2, wherein the mold is configured to simultaneously produce at least four shingles from the same parison.

12. The process of claim 11, wherein the mold is configured to simultaneously produce mold connections for the shingles from the same parison.

13. The process of claim 2, wherein the plurality of shingles are connected together and including the step of at least partially severing the plurality of shingles from each other, wherein at least one interior surface of the mold is provided with predetermined surface three-dimensional configuration and wherein a surface of the parison material that is disposed against said at least one surface of the mold is provided with three-dimensional surface configuration from the at least one surface of the mold, wherein the expanded parison in the mold includes an interior surface comprised of a plurality of generally flat surfaces, wherein the plurality of shingles are connected together and including the step of at least partially severing the plurality of shingles from each other, wherein the step of at least partially severing the plurality of shingles from each other is accomplished along planes generally parallel to said flat surfaces, and wherein the mold is configured to simultaneously produce at least two shingles from the same parison.

14. The process of molding a double walled, substantially planar exterior building product, having a hollow interior between opposed major planar layers, wherein the product is comprised of two layers of thermoplastic substantially planar building material, comprising the steps of:
  (a) providing a parison of molten thermoplastic material;
  (b) delivering the parison into a hollow mold;
  (c) closing the mold;
  (d) blow molding the parison into a plurality of substantially planar configurations by injecting a gas into the parison in the mold to expand the parison in the mold outwardly against interior surfaces of the mold; and
  (e) cooling the expanded parison and removing it from the mold; whereby
  (f) the building product has a hollow interior between opposed major planar portions; and
  (g) providing ventilation openings to the exterior of the product from said hollow interior.

15. The process of claim 14, wherein insulation is injected into the hollow interior, to line major interior surfaces thereof.

16. The process of molding a double walled, substantially planar exterior building product, having a hollow interior between opposed major planar layers, wherein the product is comprised of two layers of thermoplastic substantially planar building material, comprising the steps of:
  (a) providing a parison of molten thermoplastic material;
  (b) delivering the parison into a hollow mold;
  (c) closing the mold;
  (d) blow molding the parison into a plurality of substantially planar configurations by injecting a gas into the parison in the mold to expand the parison in the mold outwardly against interior surfaces of the mold; and
  (e) cooling the expanded parison and removing it from the mold; whereby
  (f) the building product has a hollow interior between opposed major planar portions; and
  (g) injecting insulation into the hollow interior.

17. The process of claim 16, including the step of providing ventilation conduits through the building product, including through the insulation.

18. A shingle made in accordance with the process of any one of claims 1–17.

19. A shingle made in accordance with the process of claim 13.

20. A building product made in accordance with the process of any one of claims 14–17.

21. The building product of claim 20, wherein the product comprises a shingle.

* * * * *